United States Patent
Kudva et al.

(10) Patent No.: US 11,411,563 B1
(45) Date of Patent: Aug. 9, 2022

(54) DETECTION AND MITIGATION OF UNSTABLE CELLS IN UNCLONABLE CELL ARRAY

(71) Applicant: NVIDIA Corp., Santa Clara, CA (US)

(72) Inventors: Sudhir Shrikantha Kudva, Dublin, CA (US); Nikola Nedovic, San Jose, CA (US); Carl Thomas Gray, Apex, NC (US)

(73) Assignee: NVIDIA Corp., Santa Clara, CA (US)

( * ) Notice: Subject to any disclaimer, the term of this patent is extended or adjusted under 35 U.S.C. 154(b) by 60 days.

(21) Appl. No.: 17/184,396

(22) Filed: Feb. 24, 2021

(51) Int. Cl.
| | |
|---|---|
| *H03K 19/17768* | (2020.01) |
| *H04L 9/32* | (2006.01) |
| *H04L 9/08* | (2006.01) |
| *H03K 19/173* | (2006.01) |
| *H03K 19/17748* | (2020.01) |
| *H03K 19/17704* | (2020.01) |
| *H03K 19/17756* | (2020.01) |
| *H03K 19/177* | (2020.01) |

(52) U.S. Cl.
CPC ..... *H03K 19/17768* (2013.01); *H03K 19/173* (2013.01); *H03K 19/177* (2013.01); *H03K 19/17708* (2013.01); *H03K 19/17748* (2013.01); *H03K 19/17756* (2013.01); *H04L 9/0819* (2013.01); *H04L 9/0861* (2013.01); *H04L 9/3278* (2013.01)

(58) Field of Classification Search
CPC ........... H03K 19/173; H03K 19/17708; H03K 19/17748; H03K 19/17768; H04L 9/0861; H04L 9/32; H04L 9/3278
See application file for complete search history.

(56) References Cited

U.S. PATENT DOCUMENTS

| | | | |
|---|---|---|---|
| 6,118,869 | A | 9/2000 | Kelem et al. |
| 6,873,551 | B2 | 3/2005 | Bedarida et al. |
| 7,492,630 | B2 | 2/2009 | Scheuerlein et al. |
| 7,495,947 | B2 | 2/2009 | Scheuerlein et al. |
| 7,522,448 | B2 | 4/2009 | Scheuerlein et al. |
| 7,719,874 | B2 | 5/2010 | Scheuerlein et al. |
| 9,213,835 | B2 | 12/2015 | Lesea et al. |
| 9,279,856 | B2 | 3/2016 | Laackmann et al. |
| 9,355,743 | B2 | 5/2016 | Ghosh et al. |
| 9,369,277 | B2 | 6/2016 | Augustine et al. |
| 9,698,611 | B2 | 7/2017 | Li et al. |
| 9,947,391 | B1 | 4/2018 | Mahatme et al. |
| 10,224,931 | B1 * | 3/2019 | Wang ................... H04L 9/0866 |
| 10,439,829 | B1 | 10/2019 | Lin et al. |

(Continued)

FOREIGN PATENT DOCUMENTS

EP 3640945 B1 3/2021

OTHER PUBLICATIONS

20-SC-0535TW01 Official Communication Taiwan Intellectual Property Office First Office Action dated Apr. 7, 2022.

(Continued)

*Primary Examiner* — Jason Crawford
(74) *Attorney, Agent, or Firm* — Rowan TELS LLC

(57) ABSTRACT

A circuit includes a set of multiple bit generating cells. One or more adjustable current sources is coupled to introduce perturbations into outputs of the bit generating cells. Based on the perturbations, the outputs of a subset less than all of the bit generating cells are selected, and applied as a control.

20 Claims, 12 Drawing Sheets

(56) References Cited

U.S. PATENT DOCUMENTS

| | | |
|---|---|---|
| 10,553,886 B2 | 2/2020 | Buelte et al. |
| 10,574,469 B1 | 2/2020 | Garni et al. |
| 10,644,712 B2 | 5/2020 | Cai et al. |
| 10,714,199 B1 * | 7/2020 | Bill .................... H04L 9/3278 |
| 10,764,069 B1 * | 9/2020 | Hurwitz ................ H04L 9/0866 |
| 2002/0170146 A1 | 11/2002 | Thompson |
| 2017/0047917 A1 | 2/2017 | Heo et al. |
| 2019/0165956 A1 | 5/2019 | Adham et al. |
| 2020/0044872 A1 * | 2/2020 | Willsch ................ H04L 9/3278 |
| 2021/0135886 A1 * | 5/2021 | Lee ...................... H04L 9/0866 |
| 2022/0052691 A1 * | 2/2022 | Borrel ............. H03K 19/00384 |

OTHER PUBLICATIONS

NPL_MATTHEW et al _ "PVT-Variation-Tolerant Hybrid Physically Unclonable Function Circuit for 100% Stable Secure Key Generation in 22nm CMOS" _ Feb. 11, 2014 _ pp. 278-280.

\* cited by examiner

DETECTION AND MITIGATION OF UNSTABLE CELLS IN UNCLONABLE CELL ARRAY

BACKGROUND

A conventional bit generating cell 100 is depicted in FIG. 1. Differences in source and sink current in the input stage 102 and in the output stage 104 occur due to process variations in strength of different transistor devices. The '0' or '1' value of the output bit thus varies among different instantiations of the circuit on different circuit die. The input stage 102 generates bias voltages in the PFET unit 106 and the NFET unit 108 which are stacked on one another. The voltage at the center node of the stack varies around $V_{dd}/2$ (half the supply voltage) depending on the strengths of the devices in the stack. This voltage is used to bias devices in the NFET unit 108. If the source and sink currents are different due to process variations between the devices in the input stage 102 and output stage 104, then a voltage other than $V_{dd}/2$ results at the output node which is further amplified by the inverter chain.

FIG. 2 depicts another variety of conventional bit generating cell 200. The RESET signal transitions from 0 to 1 to inject falling edges at the output of the NAND gates 202. These two edges chase each other around the loops 204, 206 and continue circulating if all the delays are identical. However, due to process variation in the NAND gates 202 and the delay elements 208, 210, the delays vary and one of the edges traverses the loops faster catches up to the second edge. The output of the bit generating cell 200 settles to either VoutA='1' and VoutB='0' or vice versa.

One type of circuit that utilizes bit generating cells is an unclonable cell array. Physically unclonable bit generating cells are utilized in such circuits for example used to generate keys for security purposes in data processing systems and devices. Unclonable bit generating cells comprise the same circuit elements and layout, but generate different values (e.g., "1" or "0") depending on manufacturing process variations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
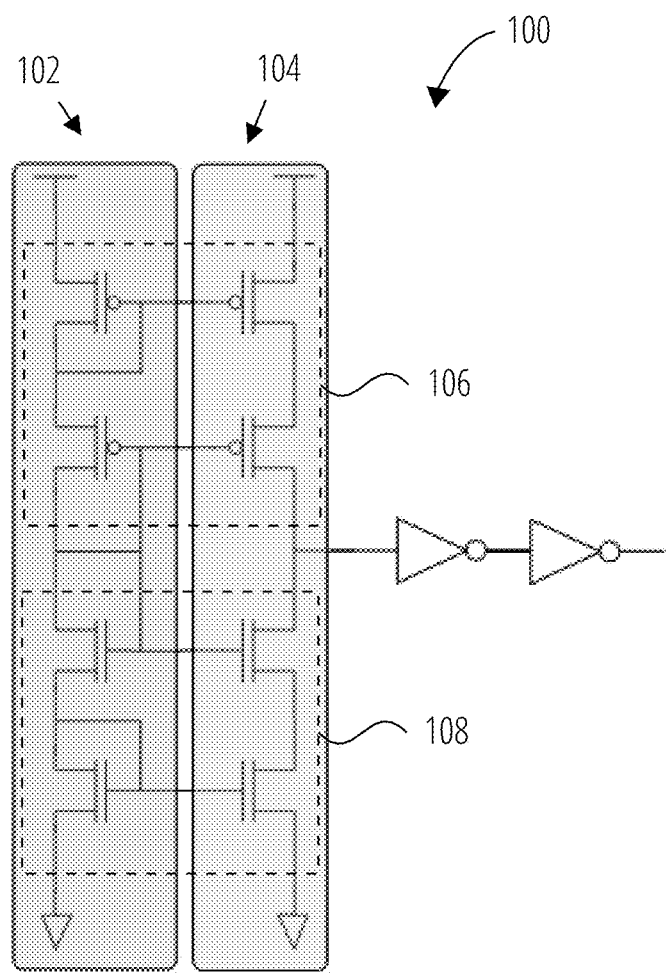
FIG. 1 depicts a conventional bit generating cell 100.
Figure 2:
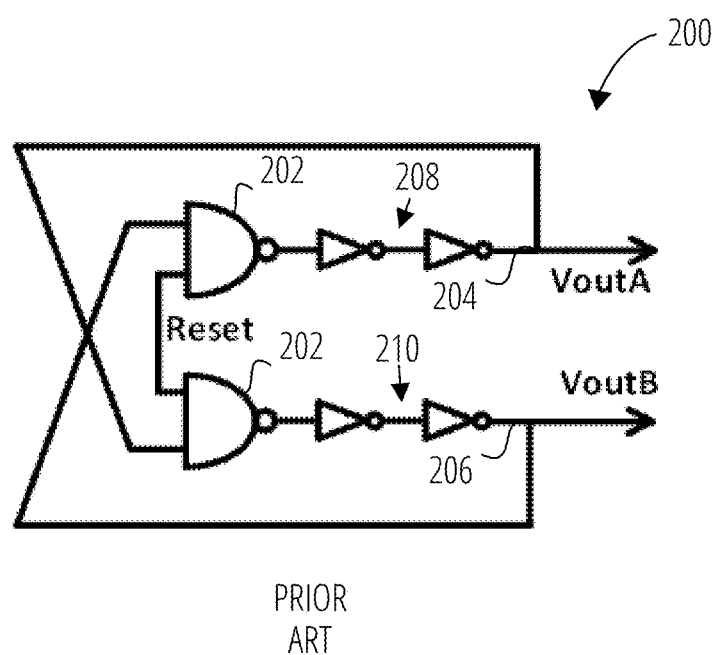
FIG. 2 depicts another type of conventional bit generating cell 200.

In one aspect, a circuit includes one or more bit generating cells, one or more adjustable current sources coupled to introduce perturbations into outputs of the bit generating cells, and logic to select and apply, based on the perturbations, the outputs of a subset less than all of the bit generating cells as a control. The circuit may include an unclonable cell array. The perturbations may be introduced with current mirrors to one or both of NFET units and PFET units of the bit generating cells. The perturbations may be variations to a transition voltage trigger value or may be signal delay perturbations, for example. The unclonable cell array may be configured to generate an encryption key or to authenticate software. In some cases the perturbations may be introduced to only the NFET units, and in other cases the perturbations may be introduced to only the PFET units. When current mirrors are utilized, at least some of the current mirrors are adjustable current mirror. However in such circuits at least some of the current mirrors may also be fixed current mirror. Other technical features may be readily apparent to one skilled in the art from the following figures, descriptions, and claims.

In another aspect, an encryption key generating circuit includes an unclonable cell array, logic to vary an input current to a set of bit generating cells in the unclonable cell array, and logic to configure a subset of the bit generating cells to generate the encryption key based on results of varying the current. The logic to vary the input current may include one or more adjustable current mirror or one or more adjustable delay element, for example. The encryption key generating circuit may be configured to vary the input current of at least some cells of the unclonable cell array independently of one another, and/or may share the logic to vary the input current among a plurality of cells of the unclonable cell array. The logic to vary the input current may include an adjustable PFET current mirror and an adjustable NFET current mirror. Other technical features may be readily apparent to one skilled in the art from the following figures, descriptions, and claims. Other technical features may be readily apparent to one skilled in the art from the following figures, descriptions, and claims.

In yet another aspect, a method includes operating a plurality of current sources to introduce perturbations into outputs of a plurality of bit generating cells, and selecting a subset less than all of the bit generating cells as a key value based a range of the perturbations in each of the bit generating cells. The bit generating cells may be arranged into an unclonable cell array. The key value may be applied as a master key to authenticate a software application, and/or to perform encryption, for example. Other technical features may be readily apparent to one skilled in the art from the following figures, descriptions, and claims.

To more clearly articulate the description of exemplary embodiments, the following terms are introduced.

An adjustable current mirror is a circuit configured such that the amount of current that is mirrored on different branches of a current mirror may be adjusted with a control signal.

A bit generating cell is any circuit that generates an output valued at binary "1" or "0".

A current mirror is any of a variety of circuit topologies that generates substantially identical current in different branches of the circuit.

A fixed current mirror is a current mirror that is not adjustable.

An NFET unit is the sub-cell of a bit generating cell comprising NFET transistors.

A PFET unit is the sub-cell of a bit generating cell comprising PFET transistors.

The transition voltage trigger value is the level of an input signal to a bit generating cell that results in a "1" to "0" transition of the output value, or vice versa.

An unclonable cell array is a collection of bit generating cells that utilize manufacturing process variations to generate output values that differ from those of other unclonable cell arrays having the same circuit structure and components, but that were manufactured on a different die. Changes in operating conditions such as temperature, voltage, and aging of the die may result in different values generated by the unclonable cell array at different instance in time.

Figure 3:
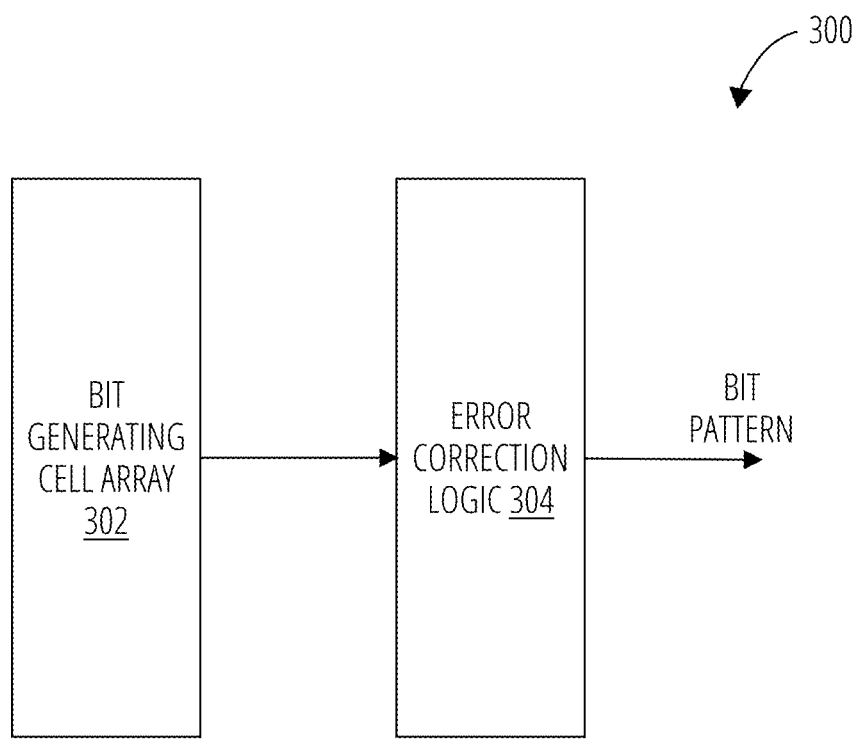
FIG. 3 depicts an unclonable bit pattern generator 300 in accordance with one embodiment.

FIG. 3 depicts an unclonable bit pattern generator 300 in one embodiment. The unclonable bit pattern generator 300 generates a bit pattern by utilizing a bit generating cell array 302 follow by error correction logic 304. The bit pattern may be applied for many purposes, including as a key for digital authentication and/or encryption. One challenge associated with the use of unclonable bit pattern generator 300 is that the output values of individual bit generating cells may vary over time under different operating conditions such as temperature, supply voltage and circuit aging. To remedy this problem, the bit generating cell array 302 output may feed into the error correction logic 304 to compensate for the unstable nature of some cells. As the number of unstable cells increases the complexity of the error correction logic 304 increases. By detecting unstable cells and reducing the percentage of unstable cells in operation over time the error correction logic 304 may be substantially simplified, improving performance, improving reliability, reducing circuit area, and potentially reducing cost.

Figure 4:
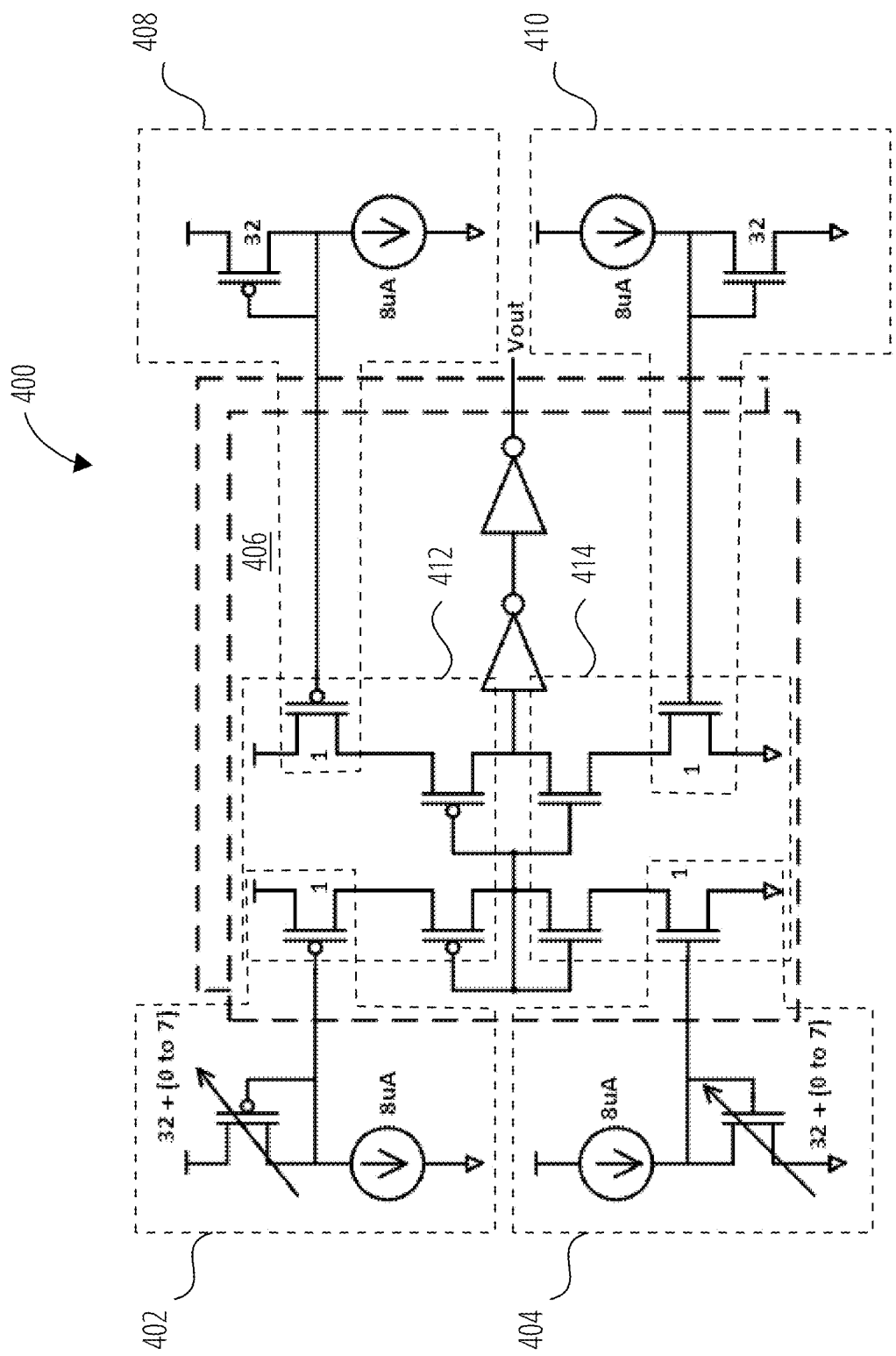
FIG. 4 depicts a tunable current mirror cell 400 in accordance with one embodiment.

FIG. 4 depicts a tunable current mirror cell 400 that may be utilized in the bit generating cell array 302 in one embodiment. The tunable current mirror cell 400 utilizes adjustable current mirrors 402, 404 on input stage transistors of the bit generating cell 406, and fixed current mirrors 408, 410 on output stage transistors of the bit generating cell 406. PFET-type current mirrors are applied to the PFET unit 412 of the bit generating cell 406, and NFET-type current mirrors are applied to the NFET unit 414 of the bit generating cell 406. In another embodiment, current mirrors 402, 404 are fixed current mirrors, and current mirrors 406, 408 are adjustable current mirrors. The description can be readily understood in regards to either embodiment.

In one embodiment, during normal operation (not detection mode), the size of the current mirrors may be set to a ratio of n:1, for example 32:1. When operated in detection mode, the fixed current mirrors 408, 410 are maintained at a ratio of n:1. The ratio of the adjustable current mirror 402 is first changed to (n+k):1 (e.g., with k variable from 0 to 7 using a three bit control code, although k can generally vary between over any practical range and correspond to any practical current step increment), while maintaining the ratio of the adjustable current mirror 404 at n:1, shifting the transition voltage downwards. The output voltage of the bit generating cell 406 is recorded for this setting. The same operation is repeated with roles of the adjustable current mirror 402 and adjustable current mirror 404 switched, shifting the transition voltage upwards. Again, the output of the bit generating cell 406 is recorded. The two recorded outputs are compared to generate a map of bit generating cells that have different values during the two measurements. These represent the cells that are less stable.

In somewhat more sophisticated embodiments, the actual width of the transition voltage windows may be recorded, rather than or in addition to the output values, providing a more detailed characterization of stability and robustness of the stability of individual cells.

In one embodiment, the detection process may be carried out once or periodically and identifications of the unstable cells may be stored in a non-volatile memory. Alternatively, the detection process may be carried out every time the bit pattern (e.g., key) is needed.

The width of the transition window (corresponding to ranges of the code values to the adjustable current mirrors) that thresholds what is considered an unstable cell may be configurable. Wider windows may result in more stable cells being characterized as unstable, whereas narrower windows may result in some unstable cells escaping detection.

In one embodiment, potentially unstable bit generating cells are detected by varying the midpoint voltage or transition voltage of one of the branches of the PFET unit/NFET unit stack, to identify cells in which the transition voltage trigger values of the different branches are close in value (i.e., within some configured tolerance of separation).

Figure 5B:
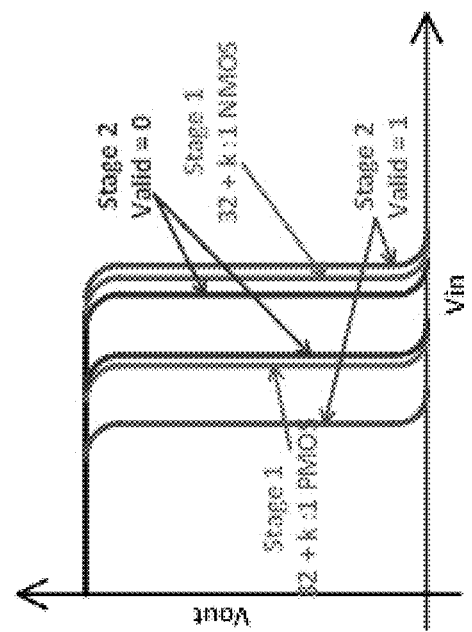
FIG. 5B depicts the signal behavior of the tunable current mirror cell 400 in additional aspects.
Figure 5A:
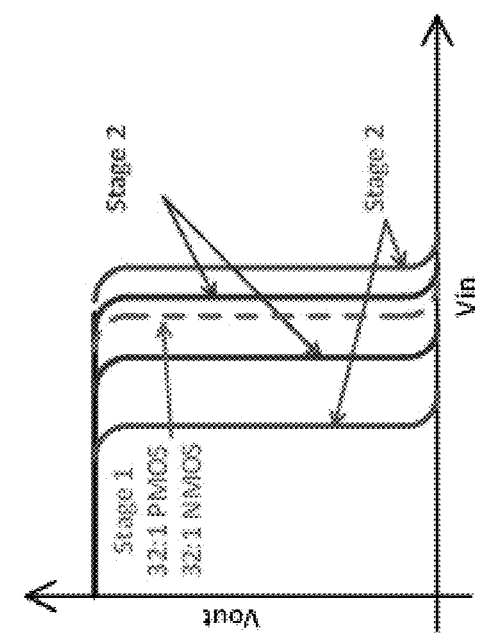
FIG. 5A depicts signal behavior for the tunable current mirror cell 400 in accordance with one embodiment.

In FIG. 5A, the transition voltage of the input stage 102 for a configured default setting of input current is depicted by the green dotted line. The transition voltage of the output stage 104 may be any one of the four other solid curves. The current to the input stage 102 is varied so that the transition voltage of the input stage 102 is both less than and more than for the default setting (FIG. 5B), creating a window around the default transition point. The unstable cells may be detected by examining the output value of the bit generating cell. Cells with output values that flip for small changes (i.e., a configured range) of the transition voltage trigger value are the ones that have a tendency to become unstable with operational process variations (lighter gray curves). The bit generating cells with output voltages that do not flip value within this window of change are the cells that may be consider stable (darker transition voltage curves) and therefore selected and applied to generate bit patterns such as authentication and/or encryption keys.

Figure 6:
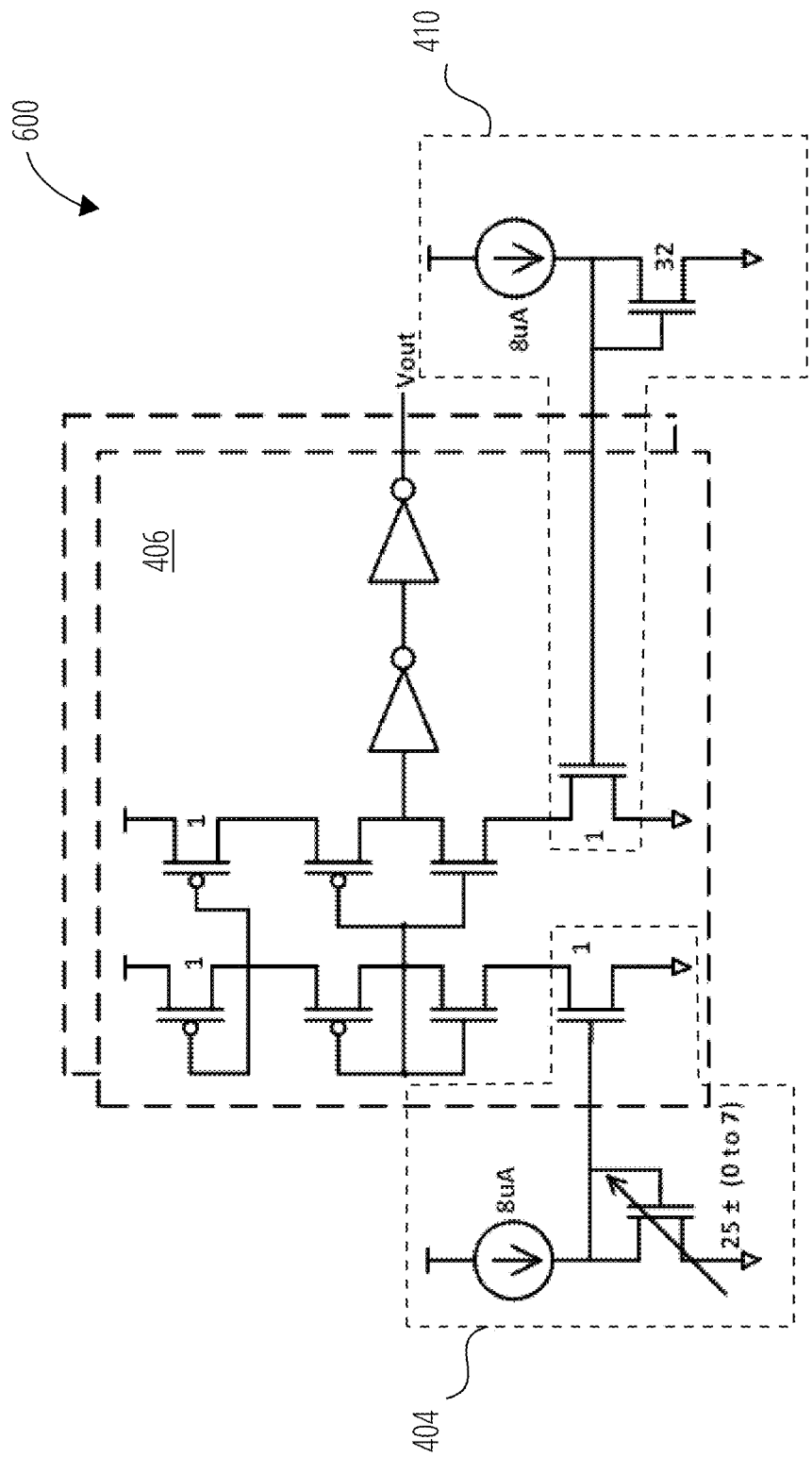
FIG. 6 depicts a tunable current mirror cell 600 in accordance with another embodiment.

FIG. 6 depicts another embodiment of a tunable current mirror cell 600 in which current mirrors 404, 410 are applied only to the NFET unit 414 of the bit generating cell 406. Likewise, yet another embodiment may apply current mirrors (e.g., 402, 408) to only the PFET unit 412 of the bit generating cell 406. This embodiment utilizes only two current mirrors to the bit generating cell 406. This may simplify circuit routing and reduce circuit area/power consumption.

Figure 7:
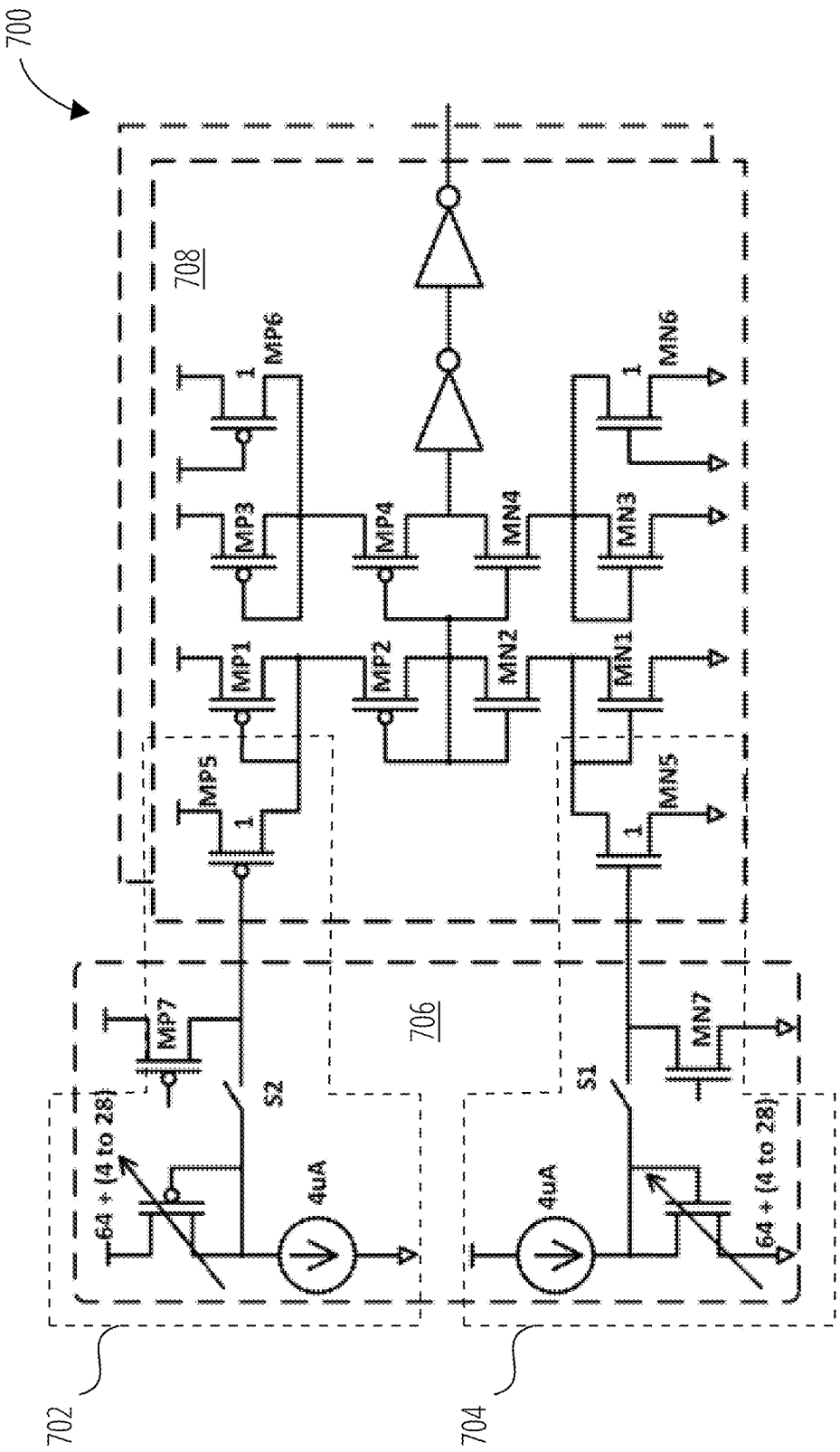
FIG. 7 a tunable current mirror cell 700 in accordance with yet another embodiment.

FIG. 7 depicts a tunable current mirror cell 700 in one embodiment in which adjustable current mirrors 702, 704 of a current source 706 are applied only to transistors of the input stage of the bit generating cell 708. Fixed current mirrors on the output stage are not utilized in this embodiment.

In the tunable current mirror cell 700, the adjustable current mirrors 702, 704 are coupled in parallel with the self-biased current sources (MN1, MN3, MP1, MP3). The adjustable current mirror 702 and adjustable current mirror 704 comprise transistors MN5 and MP5 whose gate-source voltage $V_{gs}$ is controllable. The transistors MN6 and MP6 are dummy transistors for matching purposes to MN5 and MN6, respectively, and are always turned OFF.

During the detection process either of the switch S1 or S2 is closed and the corresponding pull-down or pull-up transistor MN7 or MP7 is turned OFF. The mirroring ratio of the corresponding adjustable current source is adjusted to the configured window width as described previously. This process is performed sequentially once for the NMOS unit and then again for the PMOS unit. Cells exhibiting an output flip are noted as unstable.

During normal operation, the switches S1 and S2 are both open and the adjustable current sources 702, 704 are isolated from the 708. The pull-up and pull-down transistors (MP7 and MN7) are both turned ON to set the $V_{gs}$ of MN5 and MP5 to (ideally) 0V.

This implementation utilizes only two adjustable current sources. Additionally, during normal operation there is no input from the current sources which helps ensure that any bias in the current source does not influence the bit generating cell 708 output during normal operation.

Figure 8:
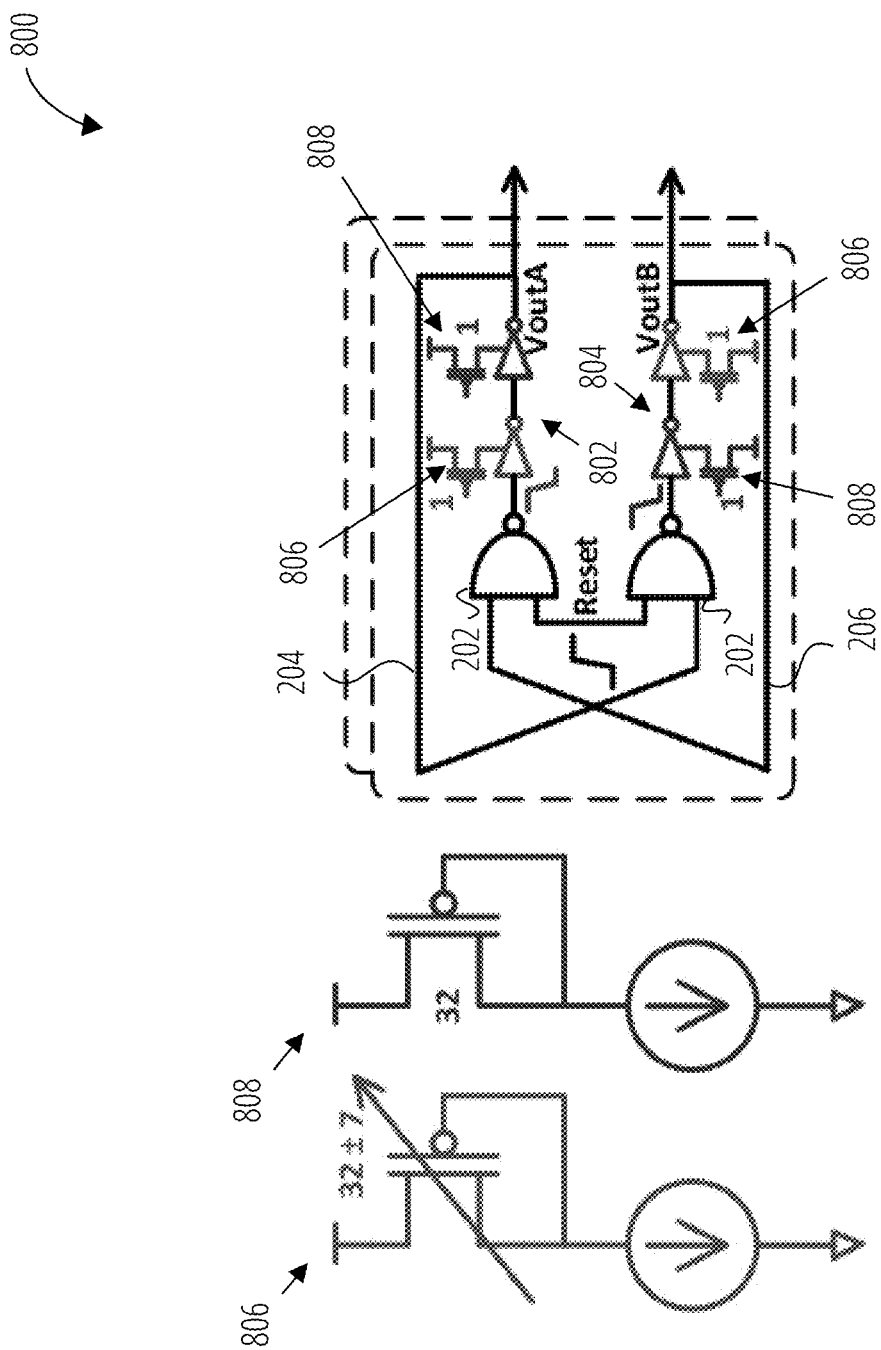
FIG. 8 depicts a tunable edge chasing cell 800 in accordance with one embodiment.

FIG. 8 depicts a tunable edge chasing cell 800 in one embodiment. The tunable edge chasing cell 800 may typically include an even number of delay elements on each loop 204, 206. One or more of the delay elements 802, 804 on each loop is coupled to an adjustable current sources 806, enabling the delay introduced by those elements into the loops to be tuned (adjusted up or down). Delay elements that are not coupled to an adjustable current source 806 may be coupled to fixed current sources 808 to hold their delay constant.

Figure 9A:
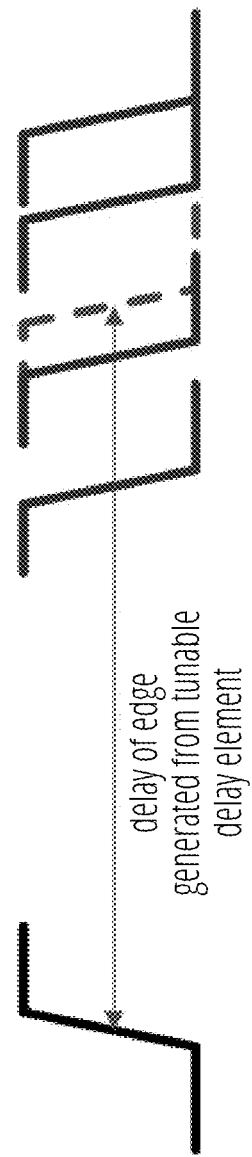
FIG. 9A depicts signal behavior of the tunable edge chasing cell 800 in accordance with one embodiment.
Figure 9B:
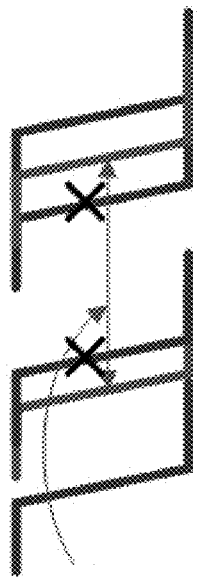
FIG. 9B depicts signal behavior of the tunable edge chasing cell 800 in additional aspects.

Adjustable current sources are coupled to certain ones of the delay elements in one or more of the loops of the tunable edge chasing cell 800. Different delay elements impact the timing of different edges, which can be controlled using the current sources. The timing of the edge depicted by the dotted line (FIG. 9A), for example, may be controlled to lag or follow the edge marked with an "X" as depicted in FIG. 9B. The detection of unstable cells follows the process described previously, with one difference. Instead of varying the internal transition voltage of the bit generating cell, the delay of delay elements (e.g., current-starved inverter cells) is varied. The delay of some delay elements may be held constant (with constant current sources) whereas one or more other delays are varied, to create a delay window around a configured default value. The cells selected for application are those whose output values do not flip even when the delay of the edge(s) is varied across a sufficiently wide configured range of values.

Figure 10:
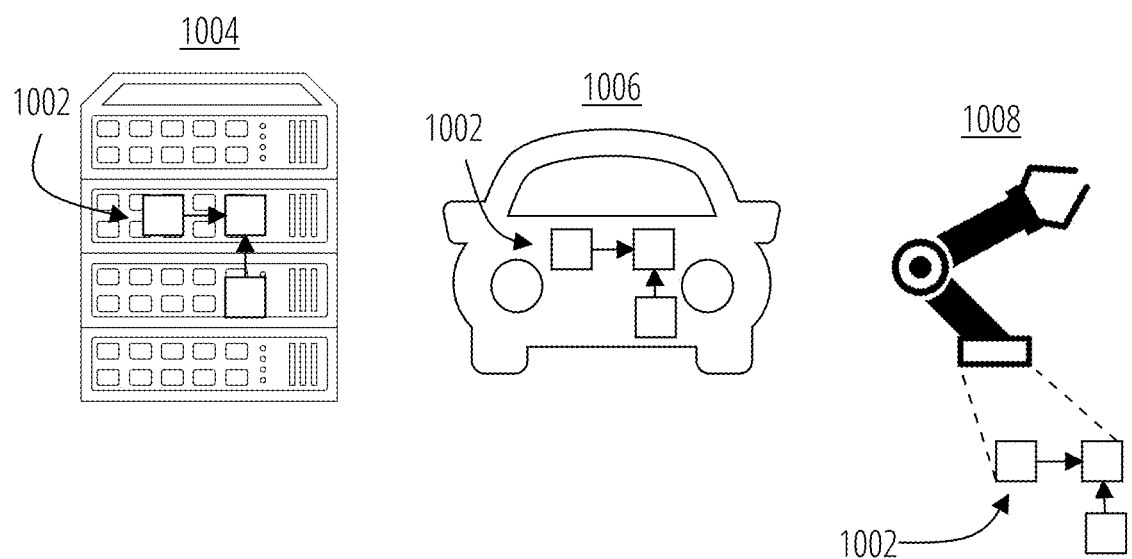
FIG. 10 depicts an unclonable cell array 1002 in accordance with one embodiment.

FIG. 10 depicts exemplary scenarios for use of an unclonable cell array 1002 in accordance with some embodiments. An unclonable cell array 1002 may be utilized in a computing system 1004, a vehicle 1006, and a robot 1008, to name just a few examples. The unclonable cell array 1002 may output bit patterns to error correction logic to form authentication and encryption keys, for example. Generally, the unclonable cell array 1002 may be utilized anywhere a bit pattern is needed.

The systems disclosed herein, or particular components thereof, may in some embodiments be utilized in conjunction with software comprising instructions executed on one or more programmable device. By way of example, components of the disclosed systems may be implemented to authenticate and/or authorize use of an application, an app, drivers, or services on particular devices. In one particular embodiment, the system may be implemented as part of an authentication service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 11:
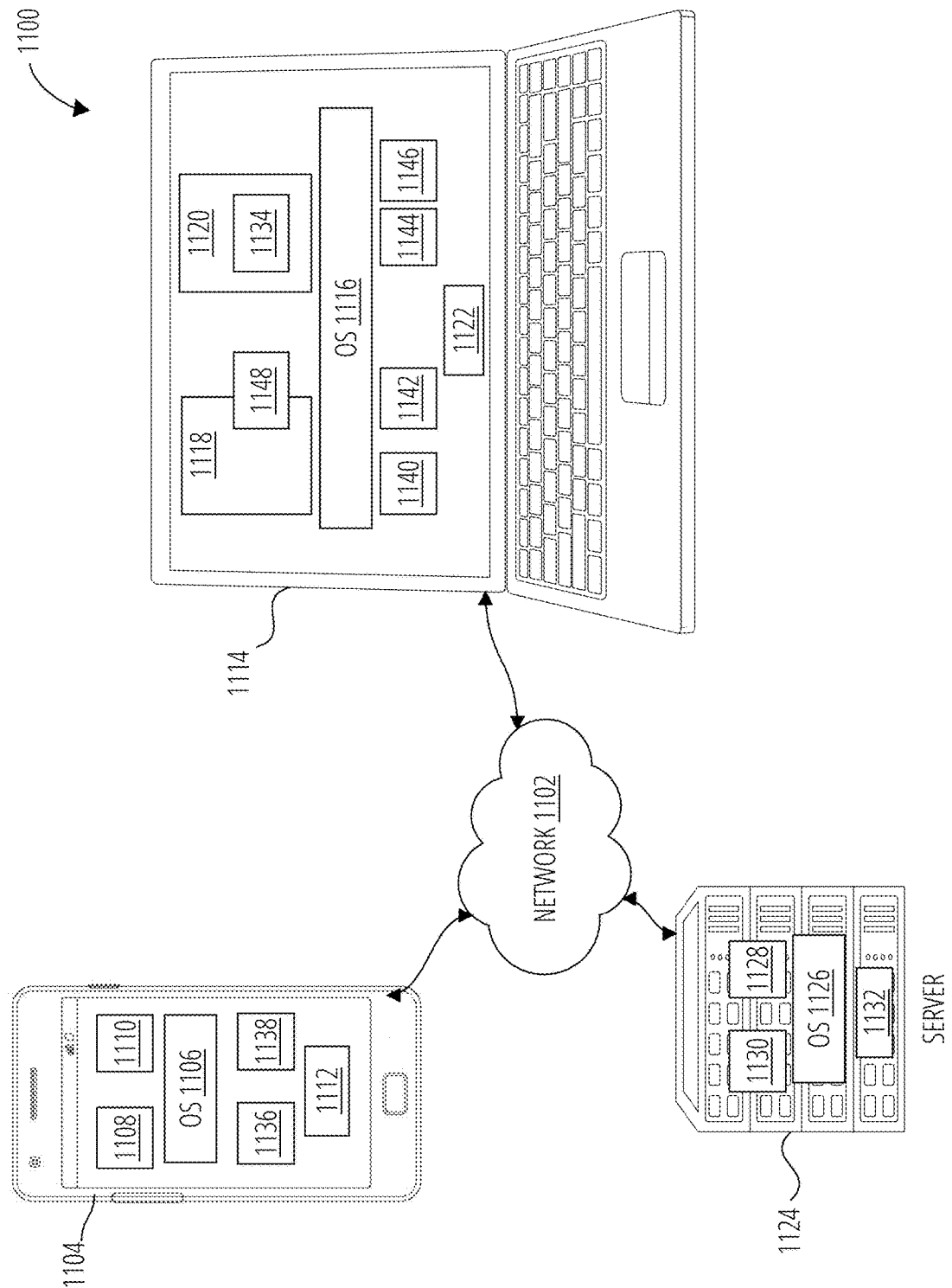
FIG. 11 depicts a computing environment 1100 in accordance with one embodiment.

Referring to FIG. 11, a computing environment 1100 illustrates various computer hardware devices and software modules coupled by a network 1102 in one embodiment. Each device includes a native operating system, typically pre-installed on its non-volatile RAM, and a variety of software applications or apps for performing various functions.

The mobile programmable device 1104 comprises a native operating system 1106 and various apps (e.g., app 1108 and app 1110). The mobile programmable device 1104 also comprises an unclonable bit array 1112. A computer 1114 includes an operating system 1116 that may include one or more library of native routines to run executable software on that device. The computer 1114 also includes various executable applications (e.g., application 1118 and application 1120), and an unclonable bit array 1122. The mobile programmable device 1104 and computer 1114 are configured as clients on the network 1102. A server 1124 is also provided and includes an operating system 1126 with native routines specific to providing a service (e.g., service 1128 and service 1130) available to the networked clients in this configuration. The server 1124 also comprises an unclonable bit array 1132.

In one embodiment, the unclonable bit array 1112 and the unclonable bit array 1122 are utilized to generate key values utilized to authenticate/authorize the mobile programmable device 1104 and computer 1114 to utilize services 1130, 1128 of the server 1124. In some embodiments, the key may also or alternatively be used for encrypted communication between these devices over the network 1102. The unclonable bit array 1132 of the server 1124 may in some embodiments be utilized to similar purpose, and/or to authenticate and/or communicate with other server devices (not depicted).

A compiler is typically used to transform source code into object code and thereafter a linker combines object code files into an executable application, recognized by those skilled in the art as an "executable". The distinct file comprising the executable would then be available for use by the computer 1114, mobile programmable device 1104, and/or server 1124. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1134).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1136 or driver 1138 on the mobile programmable device 1104 or computer 1114 (e.g., driver 1140 and driver 1142) might enable wireless headphones to be used for audio output(s) and a camera to be used for video inputs. Any of the devices may read and write data from and to files (e.g,. file 1144 or file 1146) and applications or apps may utilize one or more plug-in (e.g., plug-in 1148) to extend their capabilities (e.g., to encode or decode video files).

The network 1102 in the computing environment 1100 can be of a type understood by those skilled in the art, including a Local Area Network (LAN), Wide Area Network (WAN), Transmission Communication Protocol/Internet Protocol (TCP/IP) network, and so forth. These protocols used by the network 1102 dictate the mechanisms by which data is exchanged between devices.

Figure 12:
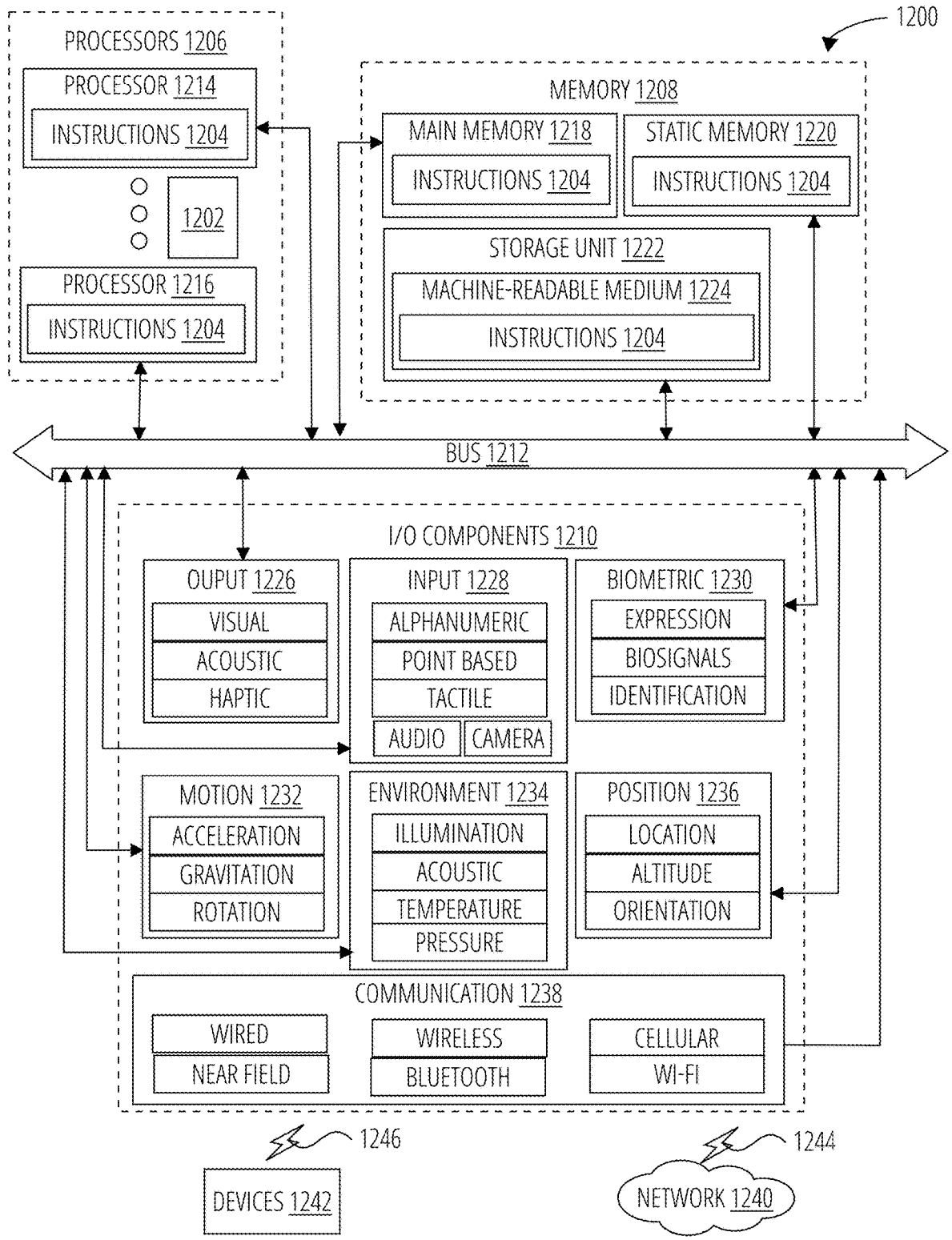
FIG. 12 depict a computer system 1200 in accordance with one embodiment.

FIG. 12 depicts a diagrammatic representation of a computer system 1200 in the form of a computer system comprising one or more bit generating cell array 1202.

Specifically, FIG. 12 depicts a computer system 1200 comprising instructions 1204 (e.g., a program, an application, an applet, an app, or other executable code) for causing the computer system 1200 to perform any one or more of the functions or methods discussed herein. The instructions 1204 configure a general, non-programmed machine into a particular computer system 1200 programmed to carry out said functions and/or methods. The bit generating cell array 1202 may be applied, for example, to generate a key to authenticate or authorize applications, apps, or other executable code to operate on the computer system 1200.

In alternative embodiments, the computer system 1200 operates as a standalone device or may be coupled (e.g., networked) to other machines. In a networked deployment, the computer system 1200 may operate in the capacity of a server machine or a client machine in a server-client network environment, or as a peer machine in a peer-to-peer (or distributed) network environment. The bit generating cell array 1202 may be applied, for example, to generate a key for communication by the computer system 1200 over a network.

The computer system 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1204, sequentially or otherwise, that specify actions to be taken by the computer system 1200. Further, while only a single computer system 1200 is depicted, the term "machine" shall also be taken to include a collection of machines that individually or jointly execute the instructions 1204 to perform any one or more of the methodologies or subsets thereof discussed herein.

The computer system 1200 may include processors 1206, memory 1208, and I/O components 1210, which may be configured to communicate with each other such as via one or more bus 1212. In an example embodiment, the processors 1206 (e.g., a Central Processing Unit (CPU), a Reduced Instruction Set Computing (RISC) processor, a Graphics Processing Unit (GPU), a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1214 and processor 1216) to execute the instructions 1204. The term "processor" is intended to include multi-core processors that may comprise two or more independent processors (sometimes referred to as "cores") that may execute instructions contemporaneously. Although FIG. 12 depicts multiple processors 1206, the computer system 1200 may include a single processor with a single core, a single processor with multiple cores (e.g., a multi-core processor), multiple processors with a single core, multiple processors with multiples cores, or any combination thereof.

Although the bit generating cell array 1202 is depicted as being part of one or more of the processors 1206, in general it may be utilized in any component, such as a motherboard or in one of the I/O components 1210.

The memory 1208 may include one or more of a main memory 1218, a static memory 1220, and a storage unit 1222, each accessible to the processors 1206 such as via the bus 1212. The main memory 1218, the static memory 1220, and storage unit 1222 may be utilized, individually or in combination, to store the instructions 1204 embodying any one or more of the functionality described herein. The instructions 1204 may reside, completely or partially, within the main memory 1218, within the static memory 1220, within a machine-readable medium 1224 within the storage unit 1222, within at least one of the processors 1206 (e.g., within the processor's cache memory), or any suitable combination thereof, during execution thereof by the computer system 1200.

The I/O components 1210 may include a wide variety of components to receive input, provide output, produce output, transmit information, exchange information, capture measurements, and so on. The specific I/O components 1210 that are included in a particular machine will depend on the type of machine. For example, portable machines such as mobile phones will likely include a touch input device or other such input mechanisms, while a headless server machine will likely not include such a touch input device. It will be appreciated that the I/O components 1210 may include many other components that are not shown in FIG. 12. The I/O components 1210 are grouped according to functionality merely for simplifying the following discussion and the grouping is in no way limiting. In various example embodiments, the I/O components 1210 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1210 may include biometric components 1230, motion components 1232, environmental components 1234, or position components 1236, among a wide array of possibilities. For example, the biometric components 1230 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 may include acceleration sensor components (e.g., accelerometer), gravitation sensor components, rotation sensor components (e.g., gyroscope), and so forth. The environmental components 1234 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1236 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1210 may include communication components 1238 operable to couple the computer system 1200 to a network 1240 or devices 1242 via a coupling 1244 and a coupling 1246, respectively. For example, the communication components 1238 may include a network interface component or another suitable device to interface with the network 1240. In further examples, the communication components 1238 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1242 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (i.e., memory 1208, main memory 1218, static memory 1220, and/or memory of the processors 1206) and/or storage unit 1222 may store one or more sets of instructions and data structures (e.g., software) embodying or utilized by any one or more of the methodologies or functions described herein. These instructions (e.g., the instructions 1204), when executed by processors 1206, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1240 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1240 or a portion of the network 1240 may include a wireless or cellular network, and the coupling 1244 may be a Code Division Multiple Access (CDMA) connection, a Global System for Mobile communications (GSM) connection, or another type of cellular or wireless coupling. In this example, the coupling 1244 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1204 and/or data generated by or received and processed by the instructions 1204 may be transmitted or received over the network 1240 using a transmission medium via a network interface device (e.g., a network interface component included in the communication components 1238) and utilizing any one of a number of well-known transfer protocols (e.g., hypertext transfer protocol (HTTP)). Similarly, the instructions 1204 may be transmitted or received using a transmission medium via the coupling 1246 (e.g., a peer-to-peer coupling) to the devices 1242. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1204 for execution by the computer system 1200, and/or data generated by execution of the instructions 1204, and/or data to be operated on during execution of the instructions 1204, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

- 100 bit generating cell
- 102 input stage
- 104 output stage
- 106 PFET unit
- 108 NFET unit
- 200 bit generating cell
- 202 NAND gates
- 204 first loop
- 206 second loop
- 208 inverters
- 210 inverters
- 300 unclonable bit pattern generator
- 302 bit generating cell array
- 304 error correction logic
- 400 tunable current mirror cell
- 402 adjustable current mirror
- 404 adjustable current mirror
- 406 bit generating cell
- 408 fixed current mirror
- 410 fixed current mirror
- 412 PFET unit
- 414 NFET unit
- 600 tunable current mirror cell
- 700 tunable current mirror cell
- 702 adjustable current mirror
- 704 adjustable current mirror
- 706 current source
- 708 bit generating cell
- 800 tunable edge chasing cell
- 802 inverters
- 804 inverters
- 806 adjustable current source
- 808 fixed current source
- 1002 unclonable cell array
- 1004 computing system
- 1006 vehicle
- 1008 robot
- 1100 computing environment
- 1102 network
- 1104 mobile programmable device
- 1106 operating system
- 1108 app
- 1110 app
- 1112 unclonable bit array
- 1114 computer
- 1116 operating system
- 1118 application
- 1120 application
- 1122 unclonable bit array
- 1124 server
- 1126 operating system
- 1128 service
- 1130 service
- 1132 unclonable bit array
- 1134 interpreter
- 1136 driver
- 1138 driver
- 1140 driver
- 1142 driver
- 1144 file
- 1146 file
- 1148 plug-in
- 1200 computer system
- 1202 bit generating cell array
- 1204 instructions
- 1206 processors
- 1208 memory
- 1210 I/O components
- 1212 bus
- 1214 processor
- 1216 processor
- 1218 main memory
- 1220 static memory
- 1222 storage unit
- 1224 machine-readable medium
- 1226 output components
- 1228 input components
- 1230 biometric components
- 1232 motion components
- 1234 environmental components
- 1236 position components
- 1238 communication components
- 1240 network
- 1242 devices
- 1244 coupling
- 1246 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A circuit comprising:
    a plurality of bit generating cells;
    one or more adjustable current sources coupled to introduce changes into outputs of at least some of the bit generating cells; and
    logic to select, based on the changes, less than all of the outputs to form a control value in a digital system.

2. The circuit of claim 1, wherein the bit generating cells form an unclonable cell array.

3. The circuit of claim 2, wherein the control value is an encryption key.

4. The circuit of claim 1, wherein the changes are introduced with current mirrors to one or both of NFET units and PFET units of the bit generating cells.

5. The circuit of claim 4, wherein the changes are introduced to only the NFET units.

6. The circuit of claim 4, wherein the changes are introduced to only the PFET units.

7. The circuit of claim 4, wherein at least some of the current mirrors are adjustable current mirrors.

8. The circuit of claim 7, wherein at least some of the current mirrors are fixed current mirrors.

9. The circuit of claim 1, wherein the changes are introduced by input signal delay changes to the bit generating cells.

10. The circuit of claim 1, wherein the changes are introduced by variations to a transition voltage trigger value of the bit generating cells.

11. An encryption key generating circuit comprising:
   an unclonable cell array;
   logic to vary input currents to at least some cells of the unclonable cell array; and
   logic to select a subset of less than all of the cells to generate the encryption key based on changes to outputs of the cells resulting from varying the input currents.

12. The encryption key generating circuit of claim 11 wherein the logic to vary the input currents comprises one or more adjustable current mirror.

13. The encryption key generating circuit of claim 12, wherein the logic to vary the input currents comprises an adjustable PFET current mirror and an adjustable NFET current mirror.

14. The encryption key generating circuit of claim 11 wherein the logic to vary the input currents comprises one or more adjustable delay element.

15. The encryption key generating circuit of claim 11, configured to vary the input currents of at least some cells of the unclonable cell array independently of one another.

16. The encryption key generating circuit of claim 11, configured to share the logic to vary the input currents among a plurality of cells of the unclonable cell array.

17. A method comprising:
   operating a plurality of current sources to introduce changes to outputs of a plurality of bit generating cells; and
   selecting a subset less than all of the bit generating cells as a key value based on a range of the changes to the outputs.

18. The method of claim 17, further comprising applying the key value as a master key to authenticate a software application.

19. The method of claim 17, further comprising applying the key value to perform encryption.

20. The method of claim 17, wherein the bit generating cells form an unclonable cell array.

* * * * *